US006167770B1

(12) United States Patent
Nass

(10) Patent No.: US 6,167,770 B1
(45) Date of Patent: Jan. 2, 2001

(54) BOLT DRIVE FOR MOTOR-VEHICLE DOOR LATCH

(75) Inventor: Ulrich Nass, Mülheim (DE)

(73) Assignee: Kiekert AG, Heiligenhaus (DE)

( * ) Notice: Under 35 U.S.C. 154(b), the term of this patent shall be extended for 0 days.

(21) Appl. No.: 09/338,036

(22) Filed: Jun. 22, 1999

(30) Foreign Application Priority Data

Jul. 8, 1998 (DE) .......................................... 298 12 177 U

(51) Int. Cl.[7] ................................ F16H 1/16; F16H 1/20

(52) U.S. Cl. ............................................... 74/425; 292/216

(58) Field of Search .......................... 74/425, 423, 89.14; 292/201, 216

(56) References Cited

U.S. PATENT DOCUMENTS 5,148,691 * 9/1992 Wallden ................................. 70/279
5,222,775 * 6/1993 Kato ..................................... 292/201
5,803,515 * 9/1998 Arabia, Jr. et al. .................. 292/216

FOREIGN PATENT DOCUMENTS 92 05 765 10/1992 (DE) .
42 10 893 10/1993 (DE) .
2-262769 * 6/1993 (GB) .

* cited by examiner

*Primary Examiner*—Rodney H. Bonck
*Assistant Examiner*—Tisha D. Waddell
(74) *Attorney, Agent, or Firm*—Herbert Dubno; Andrew Wilford

(57) ABSTRACT

A drive for a door bolt of a motor-vehicle door latch has a pivot shaft fixed on the bolt offset from the bolt, a motor having a rotary output, a transmission having an input connected to the motor output and an output shaft, and a coupling directly joining the output shaft of the transmission to the pivot shaft for rotation of the bolt by the motor. The transmission output shaft and the pivot shaft are coaxial. The shafts have confronting ends formed with respective sets of axially projecting teeth that axially overlap, engage in each other, and form the coupling. These teeth are of generally triangular cross section and the teeth of the bolt shaft are angularly interleaved with the teeth of the transmission shaft. In addition a star-section element centered on the axes is formed with a plurality of radially open pockets each receiving a respective one of the teeth. This star element is elastomeric.

12 Claims, 3 Drawing Sheets

BOLT DRIVE FOR MOTOR-VEHICLE DOOR LATCH

FIELD OF THE INVENTION

The present invention relates to a motor-vehicle door latch. More particularly this invention concerns a bolt drive for such a latch.

BACKGROUND OF THE INVENTION

A standard motor-vehicle door latch for securing a door edge to a door post comprise a latch assembly on the door edge and a bolt on the post. The latch assembly has a pivotal fork that engages around the bolt to retain the door closed, and that can be operated by inside and outside handles and controlled by lock mechanisms. It is standard to provide a central latch system with actuators that control the various functions of the latch.

In addition it is known to provide a drive that displaces the door bolt horizontally in the same direction that the latch assembly moves in when the door closes. Thus as described in German patent document 4,210,893 of Szablewski, the bolt itself is centered on a horizontal axis parallel to the normal vehicle travel direction but is mounted at its end in coaxial pivots that define an axis that is parallel to but offset slightly from the bolt axis. A powerful drive such as described in German utility model 9,205,765 is connected to the bolt to pivot it about the offset axis through about 180° so as to move the bolt itself through an arc. The purpose of this movement is to pull the door very tightly closed once it has been shut. Thus the door will seat solidly against its seals and sit perfectly flush with the surrounding vehicle body, preventing any annoying air leaks and making the car aerodymanically smooth. The motor is employed since closing the door this tightly is not something the vehicle users can be expected to do with ease, so all they have to do is swing the door to, whereupon sensors will detect the latched and partially closed position of the door and actuate the drive to pull the door to the fully closed position.

The drive for the door bolt is however a complex and expensive piece of equipment. It must be able to apply considerable force to the bolt to perform the desired tight closing operation, and therefore is a rather bulky device.

OBJECTS OF THE INVENTION

It is therefore an object of the present invention to provide an improved bolt drive for a motor-vehicle door latch.

Another object is the provision of such an improved bolt drive for a motor-vehicle door latch which overcomes the above-given disadvantages, that is which is of simple, compact, and reliable construction.

SUMMARY OF THE INVENTION

A drive for a door bolt of a motor-vehicle door latch has according to the invention a pivot shaft fixed on the bolt offset from the bolt, a motor having a rotary output, a transmission having an input connected to the motor output and an output shaft, and a coupling directly joining the output shaft of the transmission to the pivot shaft for rotation of the bolt by the motor. The transmission output shaft and the pivot shaft are coaxial.

In one system according to the invention one of the shafts has a noncylindrical projection and the other of the shafts has a complementary noncylindrical seat receiving the projection and forming therewith the coupling.

Alternately in accordance with the invention the shafts have confronting ends formed with respective sets of axially projecting teeth that axially overlap, engage in each other, and form the coupling. These teeth are of generally triangular cross section and the teeth of the bolt shaft are angularly interleaved with the teeth of the transmission shaft. In addition a star-section element centered on the axes is formed with a plurality of radially open pockets each receiving a respective one of the teeth. This star element is elastomeric.

The motor output is provided with a worm gear. The transmission input is a bevel gear meshing with the worm gear, and the transmission includes a stepdown gear train between the input and the output shaft. The transmission has a two-part housing enclosing the gear train and the motor has a mounting plate to which it is secured and which is secured to the transmission housing. Furthermore the drive further comprises a mounting plate pivotally carrying the bolt, fixed to the transmission housing, and having a hole. The pivot-shaft teeth project along the axis from the hole of the mounting plate and mesh with the teeth of the output shaft.

The perfect force transmission from the transmission output shaft to the bolt shaft ensures that the bolt will be rotated accurately. The damping action of the force-transmitting star element gives a quiet action. Furthermore the drive is easy to install since the drive and bolt subassemblies need merely be fitted axially together. The drive is very compact so it can fit easily in a door post

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
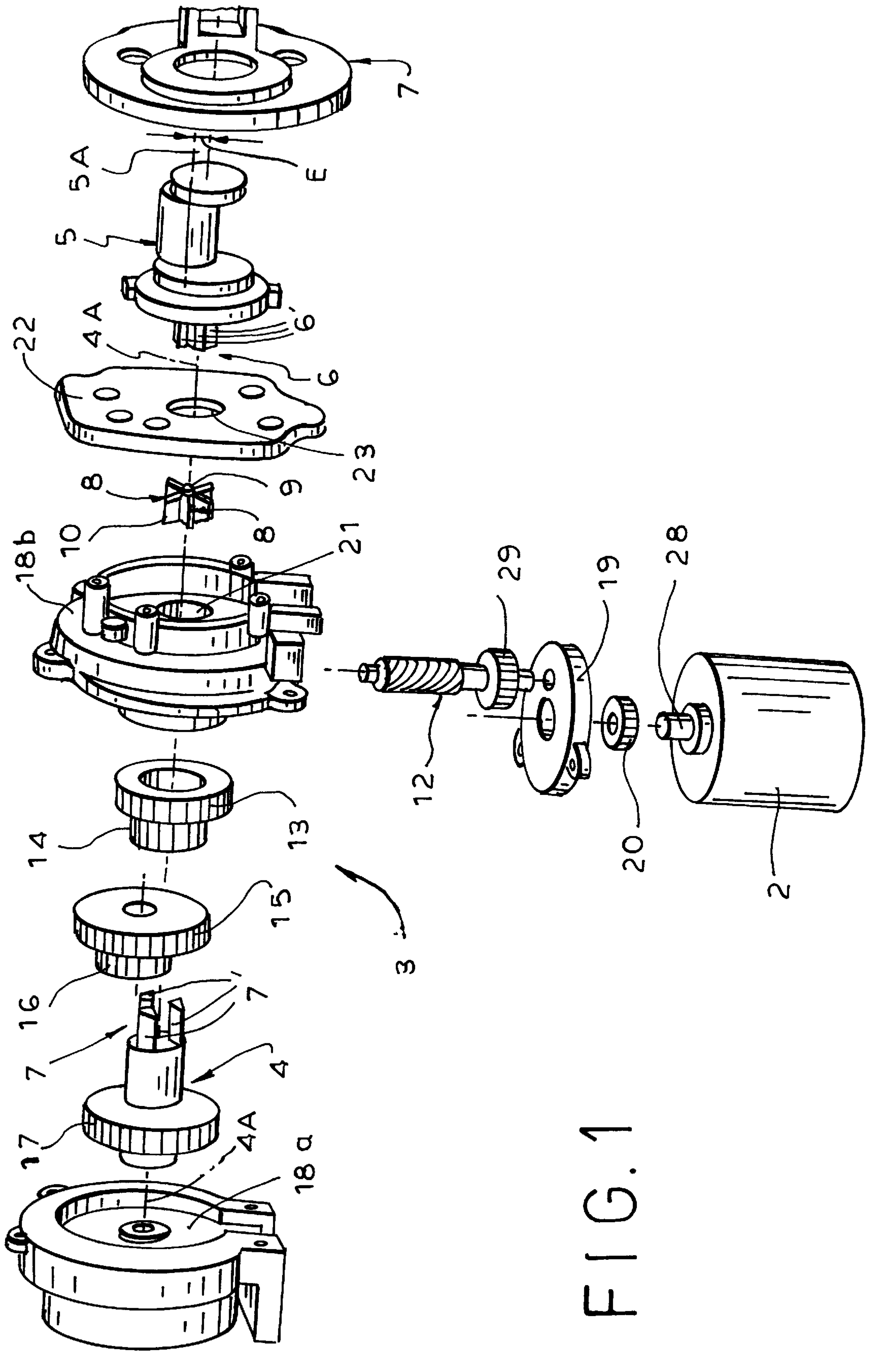
FIG. 1 is an exploded view of a bolt drive according to the invention.

As seen in FIG. 1 a door-bolt drive according to the invention basically comprises a bolt housing 1, a drive motor 2, a transmission 3 having an output shaft 4, and a door bolt 5. The bolt 5 is centered on an axis 5A offset by a distance E from an axis 4A of the transmission output shaft 4.

More specifically, the motor 2 is fixed to a mounting plate 19 and has an output shaft 28 carrying a pinion gear 20 meshing with a drive gear 29 coaxial with a worm gear 12 meshing with a large-diameter gear 13 fixed to and coaxial with another smaller gear 14 in turn meshing with another large-diameter gear 15 fixed to and coaxial with another smaller gear 16 itself meshing with a drive gear 17 fixed to the shaft 4. This gear train 12–17 produces a considerable step down so that the shaft 4 is rotated with substantial torque. The two double gears 13, 14 and 15, 16 are rotatable about respective axes offset from the axis 4A and are contained in a housing having a pair of halves **18*a* and 18*b* to which the motor mounting plate 19 is fixed. The output shaft 4 has an end 7 formed as three axially extending teeth 7' projecting through a hole 21 in the housing half 18*b***.

Figure 2:
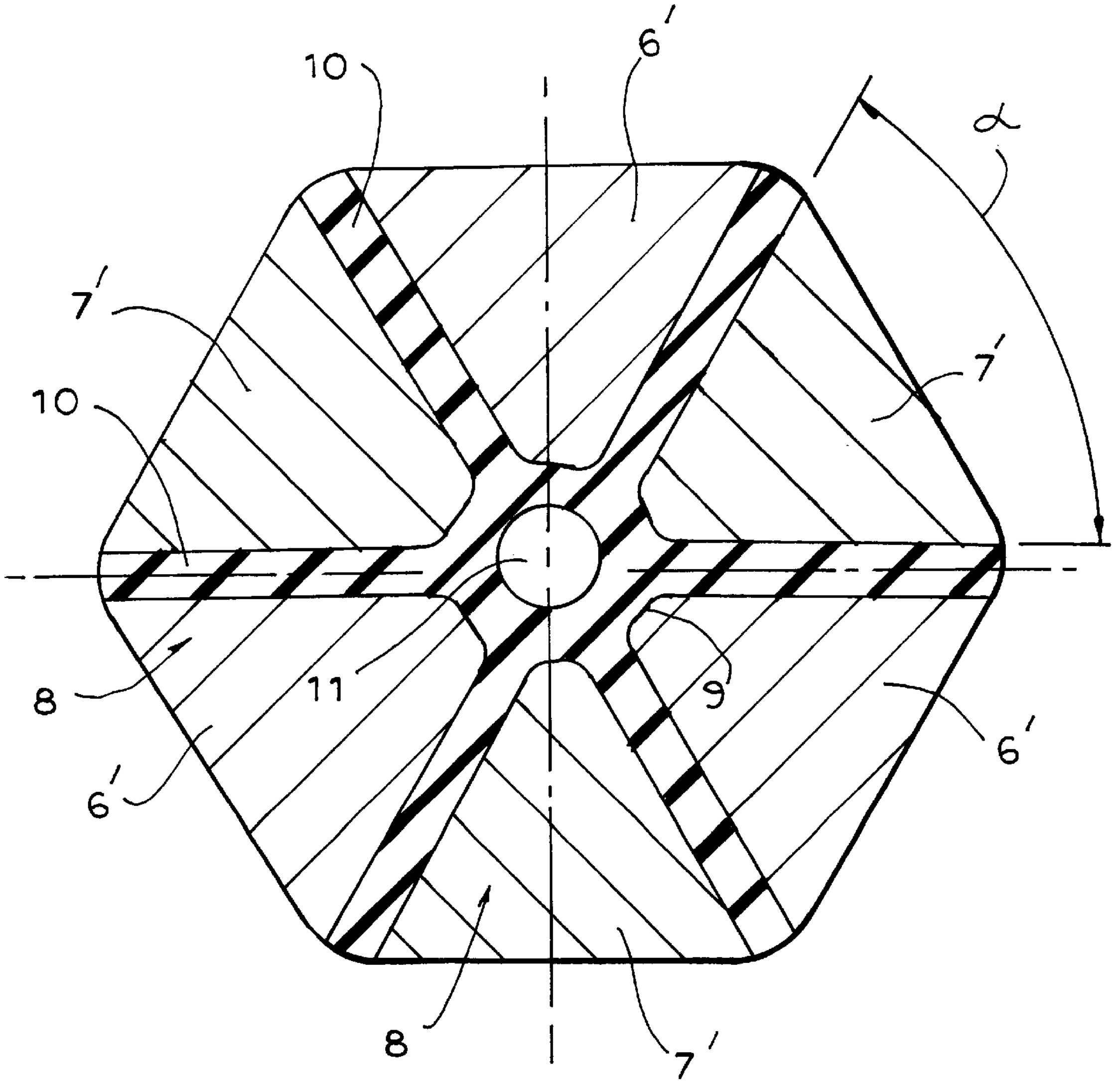
FIG. 2 is a cross section through the drive.

The bolt 5 has centered on the axis 4A a bolt shaft 6 formed with three axially extending teeth 6' that extend through a hole 23 in a mounting plate 22 to which the housing **18*a*, 18*b* and the latch plate 1 are both fixed. As shown in FIG. 2 each of the teeth 6' and 7' is of triangular section and they are angularly equispaced about an axis 11** coaxial with the axis 4A. A rubber star element 9 has radially extending arms or vanes 10 that form pockets 8 holding the teeth 6' and 7'. Adjacent vanes 10 define an angle $\alpha$ of 60° and snugly receive the teeth 6' and 7'.

With this system, therefore, the high-speed low-torque motor output at the shaft 28 is reduced to a very low-speed high-torque force transmitted coaxially and directly to the bolt shaft 6. The assembly is very compact and simple and can be counted on to have a long service life.

Figure 3:
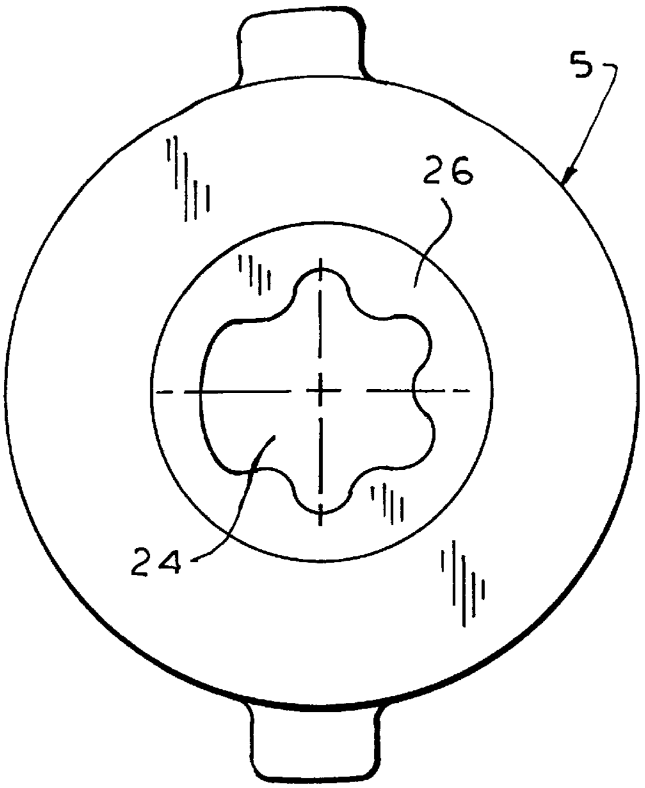
FIGS. 3 and 4 are end views of an alternative system in accordance with the invention.
Figure 4:
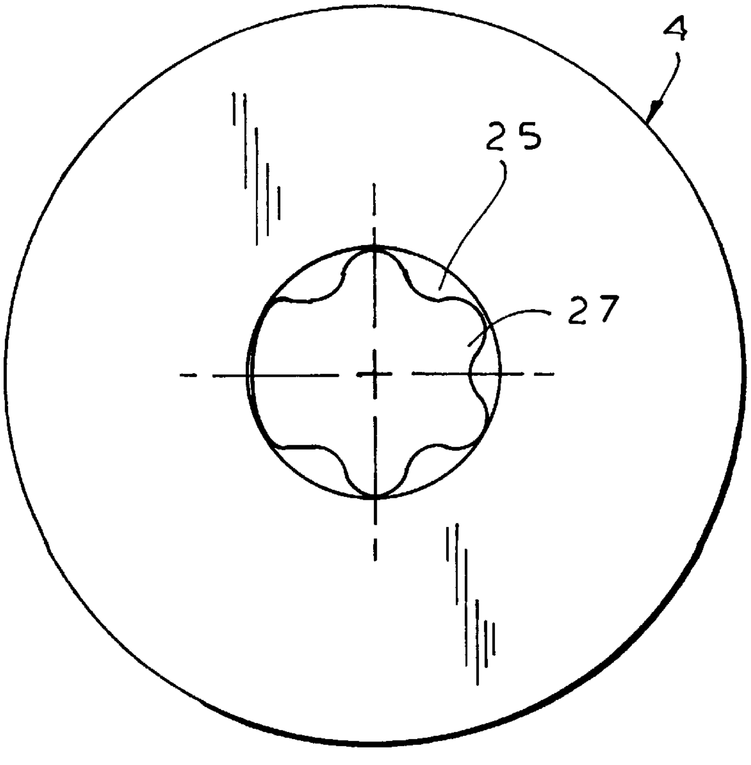

In the arrangement of FIGS. 3 and 4 the coupling parts 8–10 are replaced with a noncylindrical recess 24 formed in a nut 26 on the shaft 5 and a shaft 25 having a complementarily lobed noncylindrical end 27 formed on the shaft 4, although the parts could be reversed. This arrangement also provides for direct coaxial coupling of the transmission output to the bolt shaft.

I claim:

1. A drive for a door bolt of a motor-vehicle door latch, the drive comprising:

a pivot shaft fixed on the bolt offset from the bolt;

a motor having a rotary output; and a transmission having an input connected to the motor output and an output shaft, one of the shafts having a noncylindrical projection and the other of the shafts having a complementary noncylindrical seat receiving the projecting and forming therewith a coupling directly joining the output shaft of the transmission to the pivot shaft for rotation of the bolt by the motor.

2. The door-bolt drive defined in claim 1 wherein the transmission output shaft and the pivot shaft are coaxial.

3. The door-bolt drive defined in claim 2 wherein one of the shafts has a noncylindrical projection and the other of the shafts has a complementary noncylindrical seat receiving the projection and forming therewith the coupling.

4. The door-bolt drive defined in claim 1 wherein the motor output is provided with a worm gear, the transmission input is a bevel gear meshing with the worm gear, and the transmission includes a stepdown gear train between the input and the output shaft.

5. The door-bolt drive defined in claim 4 wherein the transmission has a two-part housing enclosing the gear train.

6. The door-bolt drive defined in claim 5 wherein the motor has a mounting plate to which it is secured and which is secured to the transmission housing.

7. A drive for a door bolt of a motor-vehicle door latch, the drive comprising:

a pivot shaft fixed on the bolt offset from the bolt;

a motor having a rotary output;

a transmission having an input connected to the motor output and an output shaft coaxial with the pivot shaft; and a coupling directly joining the output shaft of the transmission to the pivot shaft for rotation of the bolt by the motor.

8. The door-bolt drive defined in claim 7 wherein the shafts have confronting ends formed with respective sets of axially projecting teeth that axially overlap, engage in each other, and form the coupling.

9. The door-bolt drive defined in claim 8 wherein the teeth are of generally triangular cross section and the teeth of the bolt shaft are angularly interleaved with the teeth of the transmission shaft.

10. The door-bolt drive defined in claim 9 wherein the coupling further includes a star-section element centered on the axes and formed with a plurality of radially open pockets each receiving a respective one of the teeth.

11. The door-bolt drive defined in claim 10 wherein the star element is elastomeric.

12. A drive for a door bolt of a motor-vehicle door latch, the drive comprising:

a pivot shaft fixed on the bolt offset from the bolt:

a motor having a rotary output worm gear;

a transmission having an input bevel gear connected to the worm gear, an output shaft, and a stepdown gear train between the input bevel pear and the output shaft, the output shaft being formed with teeth projecting along an axis from the housing;

a coupling directly joining the output shaft of the transmission to the pivot shaft for rotation of the bolt by the motor, and a mounting plate pivotally carrying the bolt, fixed to the transmission housing, and having a hole, the pivot shaft having teeth projecting along the axis from the hole of the mounting plate and meshing with the teeth of the output shaft.

* * * * *